United States Patent
Harwood et al.

(10) Patent No.: US 8,024,407 B2
(45) Date of Patent: Sep. 20, 2011

(54) METHODS AND SYSTEMS FOR PROVIDING ACCESS, FROM WITHIN A VIRTUAL WORLD, TO AN EXTERNAL RESOURCE

(75) Inventors: William Thomas Harwood, Cambridge (GB); Hugh Tonks, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 821 days.

(21) Appl. No.: 11/873,564

(22) Filed: Oct. 17, 2007

(65) Prior Publication Data

US 2009/0106347 A1  Apr. 23, 2009

(51) Int. Cl.
G06F 15/16 (2006.01)
(52) U.S. Cl. ......... 709/205; 709/203; 709/220; 709/225
(58) Field of Classification Search ............ 709/205
See application file for complete search history.

(56) References Cited

U.S. PATENT DOCUMENTS

| | | | |
|---|---|---|---|
| 5,261,041 A | 11/1993 | Susman | |
| 5,347,306 A | 9/1994 | Nitta | |
| 5,483,630 A | 1/1996 | Unuma et al. | |
| 5,546,518 A | 8/1996 | Blossom et al. | |
| 5,577,185 A | 11/1996 | Tunnell et al. | |
| 5,736,982 A | 4/1998 | Suzuki et al. | |
| 5,742,329 A | 4/1998 | Masunaga et al. | |
| 5,867,494 A | 2/1999 | Krishnaswamy et al. | |
| 5,880,731 A | 3/1999 | Liles et al. | |
| 5,907,328 A | 5/1999 | Brush, II et al. | |
| 5,956,038 A | 9/1999 | Rekimoto | |
| 5,983,003 A | 11/1999 | Lection et al. | |
| 5,999,525 A | 12/1999 | Krishnaswamy et al. | |
| 6,119,147 A | 9/2000 | Toomey et al. | |
| 6,154,222 A | 11/2000 | Haratsch et al. | |
| 6,185,560 B1 | 2/2001 | Young et al. | |

(Continued)

FOREIGN PATENT DOCUMENTS

WO  WO-2007/022587 A1  3/2007

(Continued)

OTHER PUBLICATIONS

International Search Report from PCT/US2008/079064, mailed Jun. 25, 2009.

(Continued)

Primary Examiner — Tammy Nguyen
Assistant Examiner — Natisha Cox
(74) Attorney, Agent, or Firm — Foley and Lardner LLP; John D. Lanza

(57) ABSTRACT

In a method for providing access to resources, a virtual world application executing on a first server transmits, to a client, data representative of at least one virtual world object. The virtual world application receives, from the client, a request to access a resource executed on a second server. The virtual world application requests access to the requested resource and, in response, receives output data generated by the resource. The virtual world application transmits, to the client, the received output data and data representative of a second virtual world object. In some aspects, the virtual world application receives a request to render, on a virtual world object, output data generated by a resource executed on the client. An agent intercepts the output data generated by the resource executed on the client. A virtual world client applies the intercepted output data as a texture to a virtual world object.

12 Claims, 10 Drawing Sheets

U.S. PATENT DOCUMENTS

| | | |
|---|---|---|
| 6,263,365 B1 | 7/2001 | Scherpbier |
| 6,285,392 B1 | 9/2001 | Satoda et al. |
| 6,289,461 B1 | 9/2001 | Dixon |
| 6,330,022 B1 | 12/2001 | Seligmann |
| 6,335,927 B1 | 1/2002 | Elliott et al. |
| 6,338,086 B1 | 1/2002 | Curtis et al. |
| 6,598,075 B1 | 7/2003 | Ogdon et al. |
| 6,621,834 B1 | 9/2003 | Scherpbier et al. |
| 6,643,652 B2 | 11/2003 | Helgeson et al. |
| 6,668,273 B1 | 12/2003 | Rust |
| 6,721,747 B2 | 4/2004 | Lipkin |
| 6,731,625 B1 | 5/2004 | Eastep et al. |
| 6,754,181 B1 | 6/2004 | Elliott et al. |
| 6,763,274 B1 | 7/2004 | Gilbert |
| 6,850,893 B2 | 2/2005 | Lipkin et al. |
| 6,891,830 B2 | 5/2005 | Curtis |
| 6,909,708 B1 | 6/2005 | Krishnaswamy et al. |
| 6,970,579 B1 | 11/2005 | Thornton |
| 7,036,128 B1 | 4/2006 | Julia et al. |
| 7,072,934 B2 | 7/2006 | Helgeson et al. |
| 7,089,583 B2 | 8/2006 | Mehra et al. |
| 7,093,020 B1 | 8/2006 | McCarty et al. |
| 7,103,799 B2 | 9/2006 | Dixon |
| 7,117,136 B1 | 10/2006 | Rosedale |
| 7,133,901 B1 | 11/2006 | Dalby et al. |
| 7,145,898 B1 | 12/2006 | Elliott |
| 7,149,973 B2 | 12/2006 | Dias et al. |
| 7,162,315 B2 | 1/2007 | Gilbert |
| 7,228,332 B2 | 6/2007 | Rust |
| 7,234,943 B1 | 6/2007 | Aleali |
| 7,236,926 B2 | 6/2007 | Scherpbier et al. |
| 7,240,094 B2 | 7/2007 | Hackney et al. |
| 7,299,289 B1 | 11/2007 | Lorenz et al. |
| 7,313,595 B2 | 12/2007 | Rust |
| 7,319,992 B2 | 1/2008 | Gaos |
| 7,328,239 B1 | 2/2008 | Berberian et al. |
| 7,343,486 B1 | 3/2008 | McCarty et al. |
| 7,349,944 B2 | 3/2008 | Vernon et al. |
| 7,373,381 B2 | 5/2008 | Rust |
| 7,386,799 B1 | 6/2008 | Clanton et al. |
| 7,421,069 B2 | 9/2008 | Vernon et al. |
| 7,425,169 B2 | 9/2008 | Ganz |
| 7,426,578 B2 | 9/2008 | Jones et al. |
| 7,433,885 B2 | 10/2008 | Jones |
| 7,442,108 B2 | 10/2008 | Ganz |
| 2001/0056547 A1 | 12/2001 | Dixon |
| 2002/0052932 A1 | 5/2002 | Curtis et al. |
| 2002/0065926 A1 | 5/2002 | Hackney et al. |
| 2002/0191612 A1 | 12/2002 | Curtis |
| 2003/0014135 A1 | 1/2003 | Moulios |
| 2003/0069924 A1 * | 4/2003 | Peart et al. ............... 709/203 |
| 2003/0074393 A1 * | 4/2003 | Peart ........................ 709/203 |
| 2004/0054728 A1 | 3/2004 | Rust |
| 2004/0088168 A1 | 5/2004 | Scherpbier et al. |
| 2004/0093349 A1 | 5/2004 | Buinevicius et al. |
| 2004/0103150 A1 | 5/2004 | Ogdon et al. |
| 2005/0097470 A1 | 5/2005 | Dias et al. |
| 2005/0141507 A1 | 6/2005 | Curtis |
| 2005/0154699 A1 | 7/2005 | Lipkin et al. |
| 2005/0198292 A1 * | 9/2005 | Duursma et al. ........... 709/225 |
| 2006/0149741 A1 * | 7/2006 | Krishnamoorthy ......... 707/10 |
| 2007/0018993 A1 * | 1/2007 | Levene et al. .............. 345/582 |
| 2007/0089058 A1 | 4/2007 | Dias et al. |
| 2007/0259324 A1 | 11/2007 | Frank |
| 2008/0022204 A1 | 1/2008 | Lorenz et al. |
| 2008/0049922 A1 | 2/2008 | Karniely |
| 2008/0059583 A1 | 3/2008 | Mao et al. |
| 2008/0104171 A1 | 5/2008 | Berberian et al. |
| 2008/0112336 A1 | 5/2008 | Gray et al. |
| 2008/0126949 A1 | 5/2008 | Sharma |
| 2008/0162635 A1 | 7/2008 | Keren |
| 2008/0212948 A1 | 9/2008 | Ellis |
| 2008/0263460 A1 * | 10/2008 | Altberg et al. ............. 715/757 |
| 2008/0267094 A1 | 10/2008 | Karniely et al. |

FOREIGN PATENT DOCUMENTS

WO    WO 2007022587 A1 *    3/2007

OTHER PUBLICATIONS

Written Opinion of the International Searching Authority, from PCT/US2008/079064, dated Jun. 25, 2009, 3 pages.

Tiangqi, Wang et al. "An architecture to support scalable distributed virtual environment systems on grid," The Journal of Supercomputing, Jun. 1, 2006, vol. 36, No. 3, Kluwer Academic Publishers.

* cited by examiner

METHODS AND SYSTEMS FOR PROVIDING ACCESS, FROM WITHIN A VIRTUAL WORLD, TO AN EXTERNAL RESOURCE

FIELD OF THE INVENTION

The present disclosure relates to methods and systems for providing access to resource from within a virtual world. In particular, the present disclosure relates to methods and systems for providing access, from a virtual world application executing on a first server, to an external resource executing on a client device or a second server.

BACKGROUND OF THE INVENTION

Conventional virtual world applications generate and maintain graphical environments in which users may interact with each other and with objects displayed within the graphical environments. Typically, users interact with objects and users in the virtual world via a command line interface, a graphical avatar, or a combination of the two. In many conventional virtual worlds, a virtual world application executing on a server transmits, to a user's computer, the graphical information required to render virtual world objects for display to the user. Typically, the virtual world application enables the display of static data onto objects or surfaces generated by the virtual world application, and the static data is generated within the virtual world application.

BRIEF SUMMARY OF THE INVENTION

In one aspect, a method for providing, to a client device, access, via a command executed in a virtual world application executing on a first server, to a resource executing on a second server, includes the step of transmitting, by a virtual world application executing on a first server, to a client device, data representative of at least one virtual world object for display on the client device. The method includes the step of receiving, by the virtual world application, from the client device, a request to access a resource executed on a second server and the step of requesting, by the virtual world application, access to the requested resource executed on the second server. The method also includes the step of receiving, by the virtual world application, from the second server, output data generated by the requested resource executed on the second server and of transmitting, by the virtual world application, to the client device, the output data generated by the requested resource and data representative of a second virtual world object.

In one embodiment, the virtual world application transmits, to the client device, data representative of a second virtual world object having a texture including the output data generated by the execution of the requested resource. In another embodiment, the virtual world application transmits, to the client device, data including an instruction to render the second virtual world object with the texture including the output data generated by the execution of the requested resource. In still another embodiment, a virtual world client executing on the client device displays data representative of a second virtual world object having a texture including the output data generated by the execution of the requested resource.

In another aspect, a system for providing, to a client device, access to an application executing on a first server, via a command executed in a virtual world application executing on a second server, includes a client device, a first server and a second server. The client device displays data generated by a virtual world application. The first server executes a requested resource. The second server executes the virtual world application. The second server receives, from the first server, output data generated by the execution of the requested resource. The second server transmits, to the client device, the received data and data representative of at least one virtual world object.

In one embodiment, the virtual world application includes an agent receiving, from the first server, output data generated by the execution of the requested resource, and transmitting, to the client device, data representative of at least one virtual world object and the received output data. In another embodiment, the virtual world application includes an agent transmitting, to the client device, data representative of a second virtual world object having a texture including the output data generated by the execution of the requested resource. In still another embodiment, the virtual world application includes an agent transmitting, to the client device, data including an instruction to render the second virtual world object with the texture including the output data generated by the execution of the requested resource.

In still another aspect, a method for displaying, in a virtual world environment, output data generated by a resource executing on a first machine, the virtual world environment generated by a second machine, includes the step of receiving, by a virtual world client executing on a first machine, data representative of at least one virtual world object for display on the first machine. The method also includes the step of receiving, by the virtual world client, a request to render, on the at least one virtual world object, output data generated by a resource executed on the first machine. The method includes the step of intercepting, by an agent, the output data generated by the resource executed on the first machine. The method also includes the step of rendering, by the virtual world client, the at least one virtual world object with a texture including the output data generated by the resource executed on the first machine.

In one embodiment, the virtual world client receives data including an instruction to render a second virtual world object with the texture including the output data generated by the execution of the resource on the first machine. In another embodiment, the virtual world client receives output data generated by a second resource executed on a third machine. In still another embodiment, the virtual world client receives, data representative of a third virtual world object and an instruction to render the third virtual world object with a texture including the output data generated by the execution of the second resource on the third machine. In yet another embodiment, the virtual world client displays data representative of a second virtual world object having a texture including the output data generated by the resource executed on the first machine.

In yet another aspect, a system for displaying, in a virtual world environment, output data generated by a resource executing on a first machine, the virtual world environment generated by a second machine, includes a virtual world client and an agent. The agent executes on the first machine and intercepts output data generated by the resource executed on the first machine. The virtual world client executes on the first machine, receives, from a second machine, data representative of at least one virtual world object for display on the first machine, and renders the at least one virtual world object with a texture including the intercepted output data generated by the resource executed on the first machine. In one embodiment, the first machine is a client device and the second machine is a server.

In one embodiment, the virtual world client includes a receiver for receiving data including an instruction to render a second virtual world object with the texture including the output data generated by the resource executed on the first machine. In another embodiment, the virtual world client includes a receiver for receiving output data generated by a second resource executed on a third machine, data representative of a third virtual world object, and an instruction to render the third virtual world object with a texture including the received output data. In yet another embodiment, the system includes a virtual world application executing on the second machine and transmitting, to the virtual world client, data representative of the at least one virtual world object.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
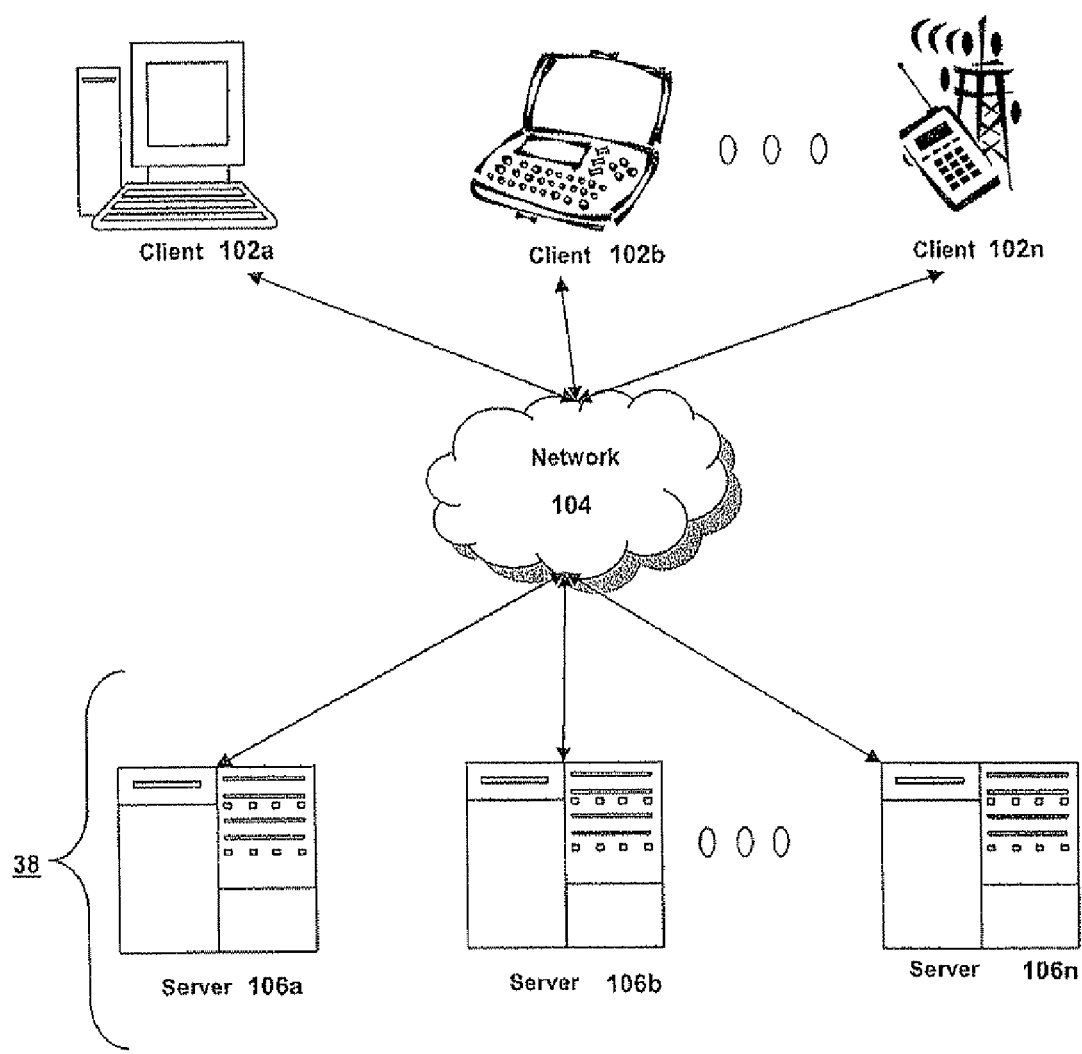
FIG. 1A is a block diagram depicting an embodiment of a network environment comprising local machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client computer(s) 102, client device(s) 102, or endpoint(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output data of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the Citrix Access Suite™ by Citrix Systems, Inc., such as the MetaFrame or Citrix Presentation Server™, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

In some embodiments, a server 106 executes a virtual world application providing a client with access to an interactive environment. In one of these embodiments, the interactive environment is a graphical environment in which users interact with each other via a combination of avatars and communications via command line interfaces. In another of these embodiments, the virtual world application is an application such as SECOND LIFE provided by Linden Research, Inc., of San Francisco, Calif., or the ALICE STREET CONFERENCE CENTER provided by Alice Street, Inc., of Hamilton, Ontario, Canada, or PROTOSPHERE provided by ProtonMedia, Inc., of Lansdale, Pa., or the CONVENOS MEETING CENTER line of products provided by Convenos, Inc., of Scotts Valley, Calif., or THERE provided by Makena Technologies, Inc, of San Mateo, Calif. In still another of these embodiments, the virtual world application is an application such as QWAQ FORUMS provided by Qwaq, Inc., of Palo Alto, Calif., or MEETSEE provided by Halcyon Worlds, Inc., of Atlanta Ga., or PROJECTPLACE provided by Projectplace International AB, of Stockholm, Sweden, or NOMADESK provided by Aventiv BE of Sint-Martens-Latem, Belgium. In yet another of these embodiments, the virtual world application is an application developed using a toolkit such as CROQUET provided by The Croquet Consortium, Inc., of Durham, N.C., or MULTIVERSE provided by The Multiverse Network, Inc., of Mountain View, Calif.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output data to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In some embodiments, a client 102 executes a client-side virtual world application or agent in communication with a server-side virtual world application or agent. In one of these embodiments, the virtual world application is an application such as SECOND LIFE provided by Linden Research, Inc., of San Francisco, Calif., or the ALICE STREET CONFERENCE CENTER provided by Alice Street, Inc., of Hamilton, Ontario, Canada, or PROTOSPHERE provided by ProtonMedia, Inc., of Lansdale, Pa., or the CONVENOS MEETING CENTER line of products provided by Convenos, Inc., of Scotts Valley, Calif., or THERE provided by Makena Technologies, Inc, of San Mateo, Calif. In another of these embodiments, the virtual world application is an application such as QWAQ FORUMS provided by Qwaq, Inc., of Palo Alto, Calif., or MEETSEE provided by Halcyon Worlds, Inc., of Atlanta Ga., or PROJECTPLACE provided by Projectplace International AB, of Stockholm, Sweden, or NOMADESK provided by Aventiv BE of Sint-Martens-Latem, Belgium. In still another of these embodiments, the virtual world application is an application developed using a toolkit such as CROQUET provided by The Croquet Consortium, Inc., of Durham, N.C., or MULTIVERSE provided by The Multiverse Network, Inc., of Mountain View, Calif.

In other embodiments, a plurality of clients 102 executes peer-to-peer virtual world applications. In one of these embodiments, each client 102 provides the functionality of a server 106. In another of these embodiments, the virtual world application is an application such as that provided by moove corporation of Los Angeles, Calif.

Figure 1B:
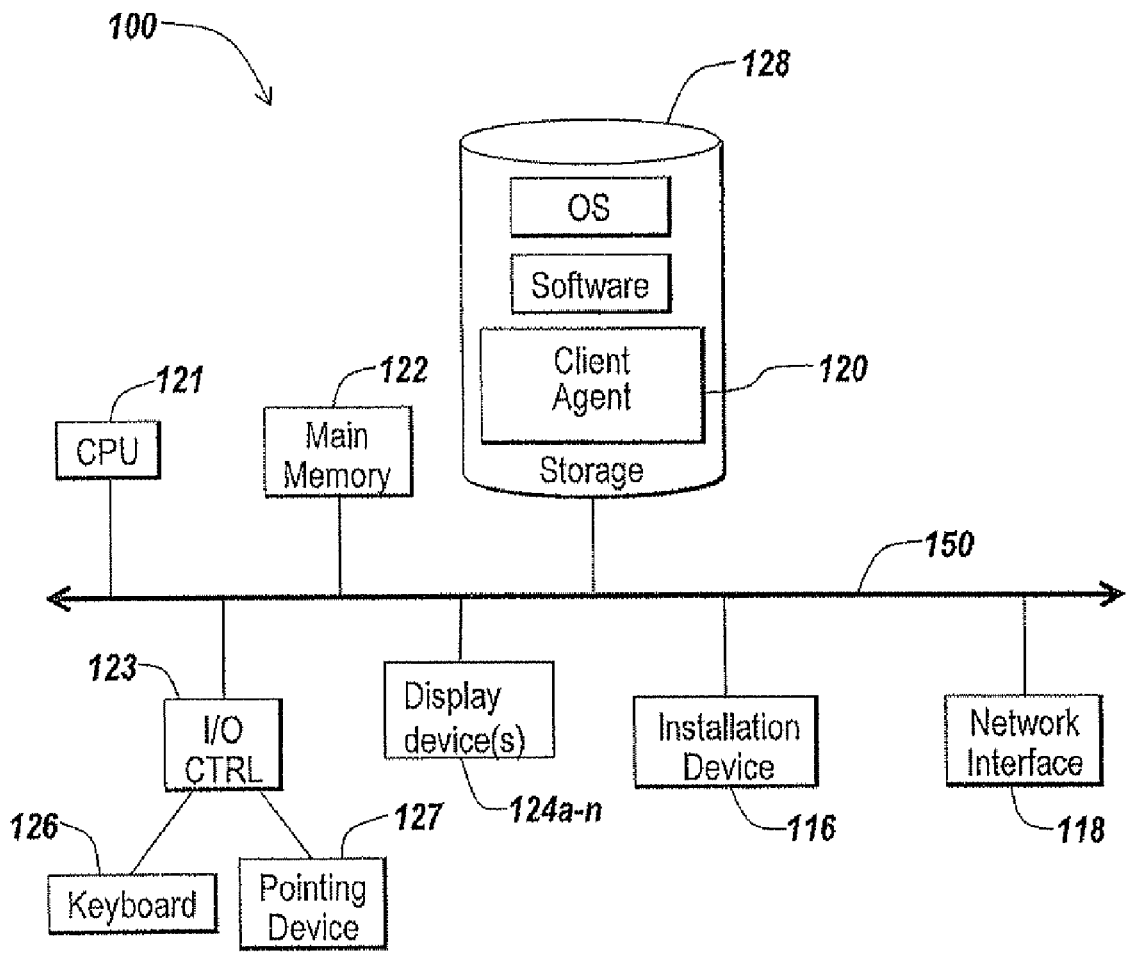
FIGS. 1B and 1C are block diagrams depicting embodiments of computing devices useful in connection with the methods and systems described herein.
Figure 1C:
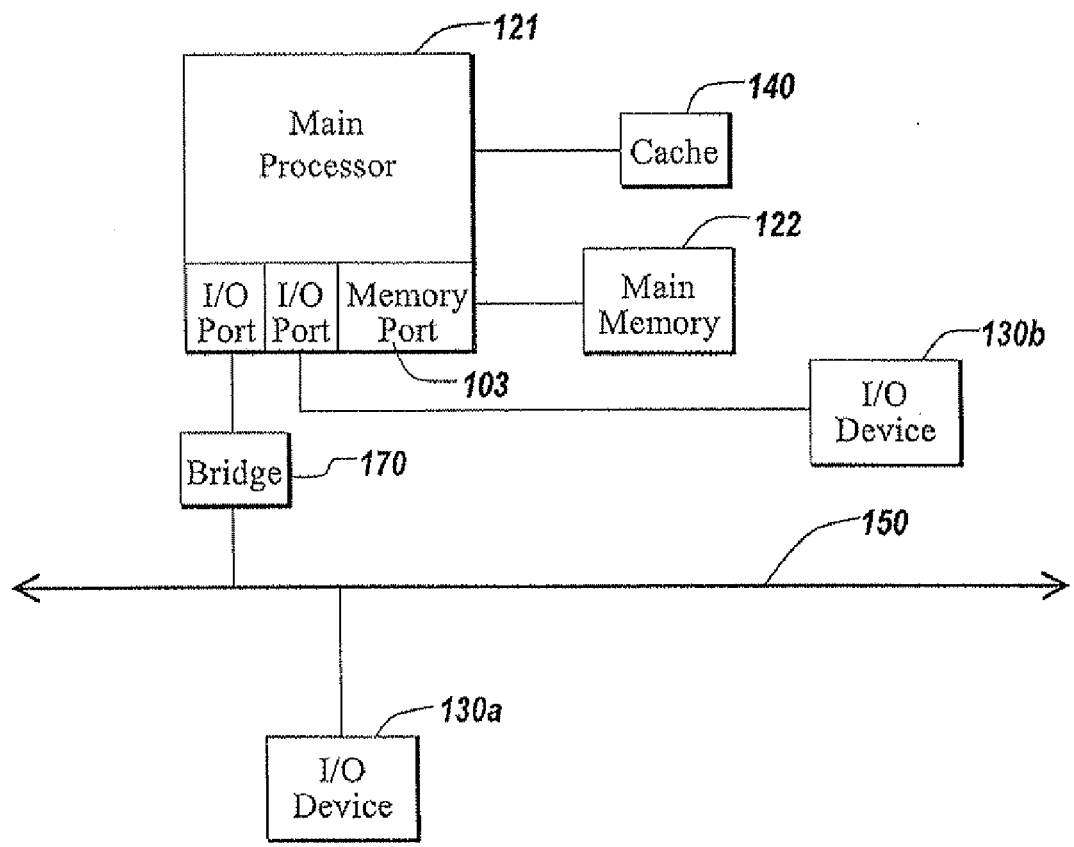

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360™ device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple iPod, iPod Touch, iPod Nano, and iPod Shuffle lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

In one embodiment, the server 106 includes a policy engine for controlling and managing the access to a resource, selection of an execution method for accessing the resource, and the delivery of resources. In another embodiment, the server 106 communicates with a policy engine. In some embodiments, the policy engine determines the one or more resources a user or client 102 may access. In other embodiments, the policy engine determines how the resource should be delivered to the user or client 102, e.g., the method of execution. In still other embodiments, the server 106 provides a plurality of delivery techniques from which to select a method of execution, such as a server-based computing, application streaming to the client 102, or delivering the application locally to the client 102 for local execution.

In one embodiment, a client 102 requests access to a resource and a server 106 selects a method of executing the resource. In another embodiment, the server 106 receives credentials from the client 102. In still another embodiment, the server 106 receives a request for an enumeration of available resources from the client 102. In still even another embodiment, in response to the request or to the receipt of credentials, the server 106 enumerates a plurality of resources available to the client 102. In yet another embodiment, the server 106 provides the client 102 with access to the requested resource according to the selected method of executing the resource.

Figure 2A:
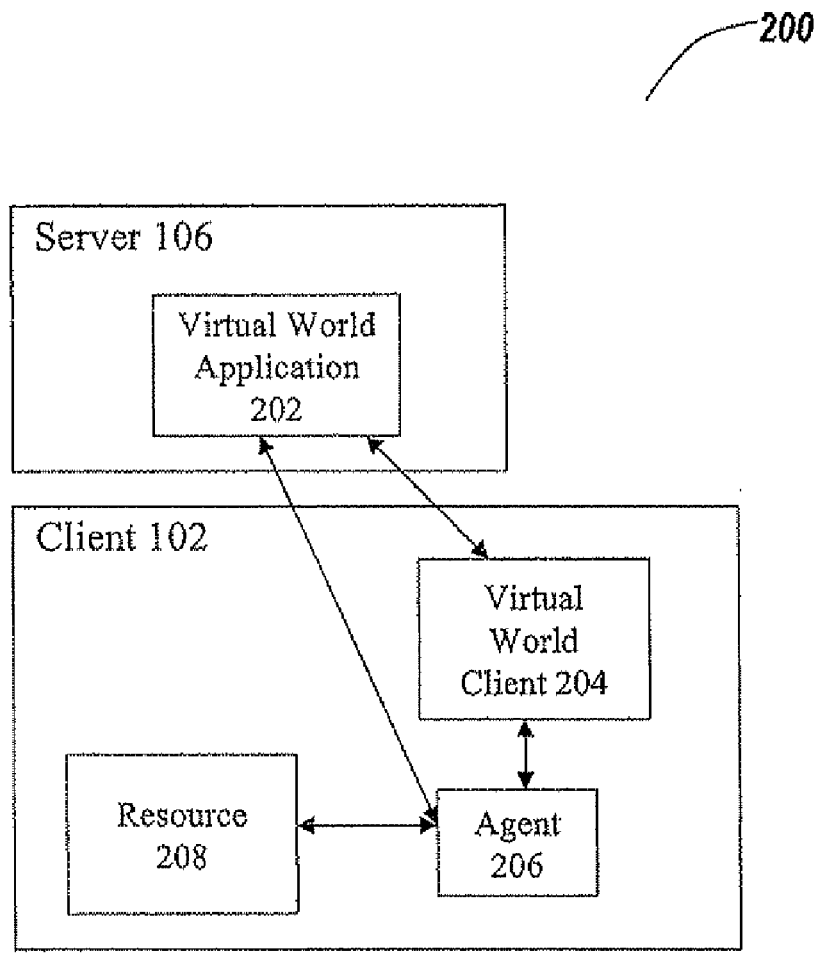
FIG. 2A is a block diagram depicting one embodiment of a system for displaying, in a virtual world environment, output data generated by a resource executing on a first machine, the virtual world environment generated by a second machine.

Referring now to FIG. 2A, a system 200 for displaying, in a virtual world environment, output data generated by a resource executing on a first machine, the virtual world environment generated by a second machine, includes a virtual world client and an agent executing on the first machine. In brief overview, the agent 206 executes on a first machine 102 and intercepts output data generated by a resource 208 executed on the first machine 102. The virtual world client 204 executes on the first machine 102. The virtual world client 204 receives, from a second machine 106, data representative of at least one virtual world object for display on the first machine 102. The virtual world client 204 renders the at least one virtual world object with a texture including the intercepted output data generated by the resource 208 executed on the first machine 102.

With continued reference to FIG. 2A, and in greater detail, the system 200 includes a virtual world application 202 executing on the second machine 106 and transmitting, to the virtual world client 204, data representative of at least one virtual world object for display on the first machine 102. The virtual world application 202 includes a transmitter for sending, to the first machine 102, data representative of at least one virtual world object for display on the first machine 102. In one embodiment, the transmitter sends data including at least one instruction for rendering the at least one virtual world object. In another embodiment, the transmitter sends data including at least one instruction for applying a texture to the at least one virtual world object. In still another embodiment, and as described in greater detail below, the virtual world application 202 is in communication with a presentation layer protocol client 404.

In one embodiment, the virtual world application 202 includes functionality for executing a physics engine, performing collision detection, tracking state for a plurality of virtual world objects, and transmitting graphical information associated with at least one virtual world object to a first machine 102 for rendering. In another embodiment, the virtual world application 202 is in communication with at least one second machine 106b and exchanges information associated with user authentication, billing information, rendering a map of a virtual world, and tracking and updating a state of a virtual world object.

In one embodiment, the virtual world client 204 executes on a first machine 102 and the virtual world application 202 executes on a second machine 106. In another embodiment the first machine 102 is a client device 102. In still another embodiment, the second machine 106 is a server 106. In yet another embodiment, the first machine 102 and the second machine 106 are machines 102 and 106 as described above in connection with FIGS. 1A-C.

In one embodiment, the virtual world application 202 includes a messaging component for transmitting data representative of virtual world objects to the first machine 102. In another example, the virtual world application 202 may transmit, to the first machine 102, data generated in compliance with a virtual world client-server protocol, such as the SECOND LIFE protocol, referred to as libsecondlife, developed by Linden Research, Inc. In still another embodiment, the virtual world application 202 communicates with a virtual world client 204 according to a networking protocol such as TCP/IP, UDP, IP version IP4, IP6, IPSEC, the H.323 protocol promulgated by the International Telecommunication Union, the T.120 protocol promulgated by the International Telecommunication Union or the protocols described above in connection with FIGS. 1A-C.

In one embodiment, the virtual world client 204 is referred to as a "viewer", as it allows a user of the first machine 102 to view a display of virtual world objects. In another embodiment, the virtual world application 202 transmits, to the virtual world client 204, data needed to generate the at least one virtual world object for display on the first machine 102. In still another embodiment, the viewer includes a physics engine. In still even another embodiment, the viewer tracks a state of a virtual world object; for example, the viewer may track a position, velocity, or other physics-related information associated with a virtual world object. In yet another embodiment, the viewer receives graphical data associated with a virtual world object and renders the virtual world object responsive to the received graphical data. In some embodiments, the virtual world application 202 provides the functionality of the virtual world client 204.

In one embodiment, a resource 208 is a program, an application, a document, a file, a plurality of applications, a plurality of files, an executable program file, a desktop environment, a computing environment, or other resource made available to a user of the first machine 102. In another embodiment, a resource 208' is executed to provide a user with access to a requested resource 208. For example, the user may request access to a file on the first machine 102 and a resource 208' capable of processing the requested file is executed on the first machine 102. The resource 208 may be delivered to the first machine 102 via a plurality of access methods including, but not limited to, installation directly on the first machine 102, delivery to the first machine 102 via a method for application streaming, delivery to the first machine 102 of output data generated by an execution of the resource 208 on a second machine 106b and communicated to the first machine 102 via a presentation layer protocol, delivery to the first machine 102 of output data generated by an execution of the resource 208 via a virtual machine executing on a second server 106b, or execution from a removable storage device connected to the first machine 102, such as a USB device.

In some embodiments, a resource includes a plurality of applications, desktops, or computing environments. In one of these embodiments, a user may request access to the resource and receive access to the plurality of applications, desktops, or computing environments. In another of these embodiments, a user may control the plurality of applications, desktops, or computing environments in the resource by controlling a virtual world object associated with the resource. For example, a user may request the execution, termination, or suspension of one or more resources within the plurality of resources.

In one embodiment, the virtual world client 204 displays a virtual world object having a texture including the output data generated by the execution of the resource 208, responsive to the received data. In another embodiment, to apply a texture to a virtual world object, the virtual world client 204 renders the virtual world object with a particular surface, pattern, color, or with additional graphical detail. In still another embodiment, the virtual world client 204 applies a bitmap intercepted by the agent 206 as a texture to a virtual world object rendered responsive to data received from the virtual world application 202.

In some embodiments, the first machine 102 displays, to a user, via the display device 124, a plurality of graphical components, such as windows and pull-down menus, which together are generally referred to as a "desktop." A user of first machine 102 requests access to a resource by selecting a graphical representation, such as an icon, associated with the resource. In one of these embodiments, an area of the desktop is reserved for graphical user interface components associated with a resource identified by the user. In another of these embodiments, a window on the desktop is reserved for graphical user interface components associated with a resource identified by the user. In still another of these embodiments, the user of the first machine 102 identifies a resource for rendering on the virtual world object by placing the graphical representation of the resource into a portion of the desktop reserved for identified resources. For example, a user may drag, into a window or portion of the desktop display, an icon representing an application available for execution on the first machine 102. The window may be a window associated with the agent 206.

Figure 2B:
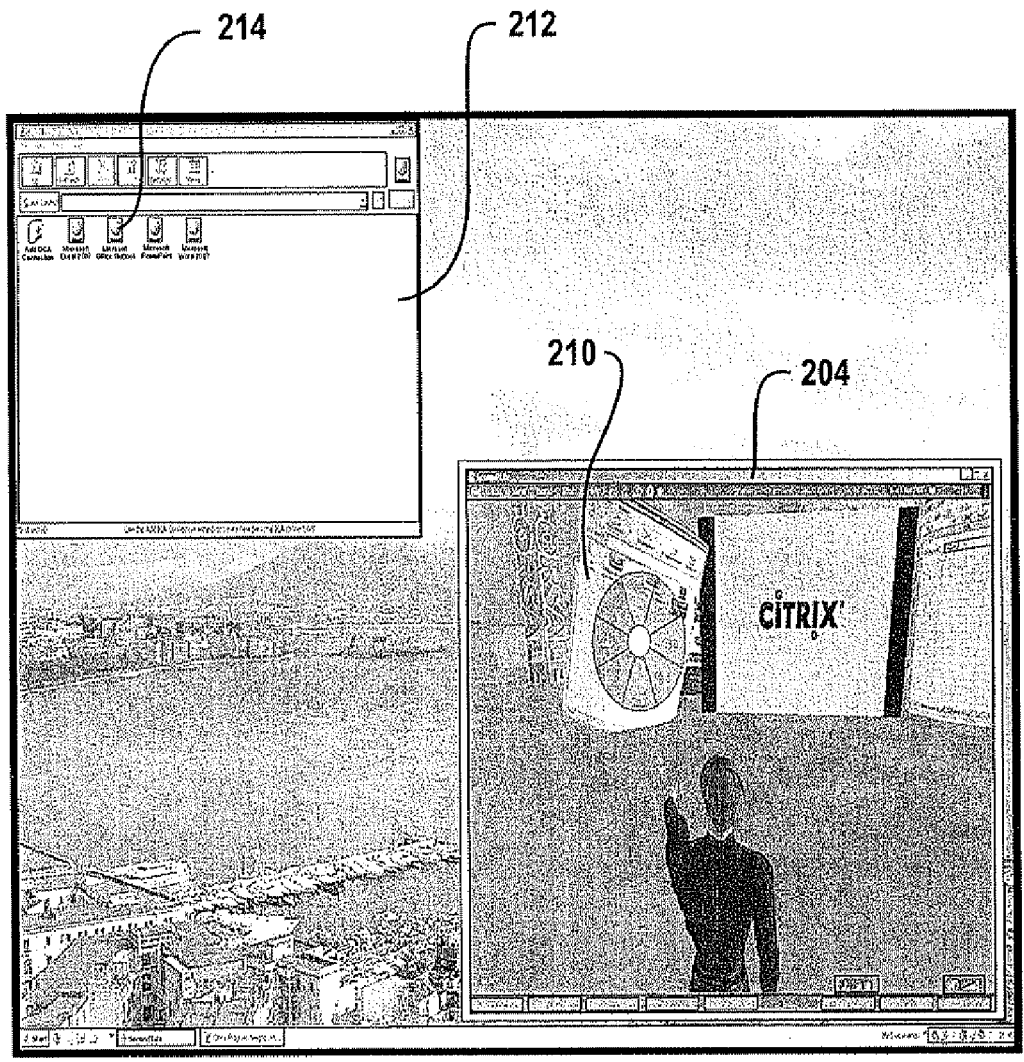
FIG. 2B is a screen shot depicting one embodiment of a display including a virtual world client and a graphical representation of a local resource.

Referring now to FIG. 2B, a screen shot depicts one embodiment of a display 124 including a resource 208 and a virtual world client 204. The virtual world client 204 displays a virtual world object 210 having a texture associated with a resource 208. In FIG. 2B, a user has dragged a graphical representation 212 of the resource 208 to a window 214 on the display 124. The virtual world client 204 renders the virtual world object 210 with a texture displaying the graphical representation 212.

Figure 2C:
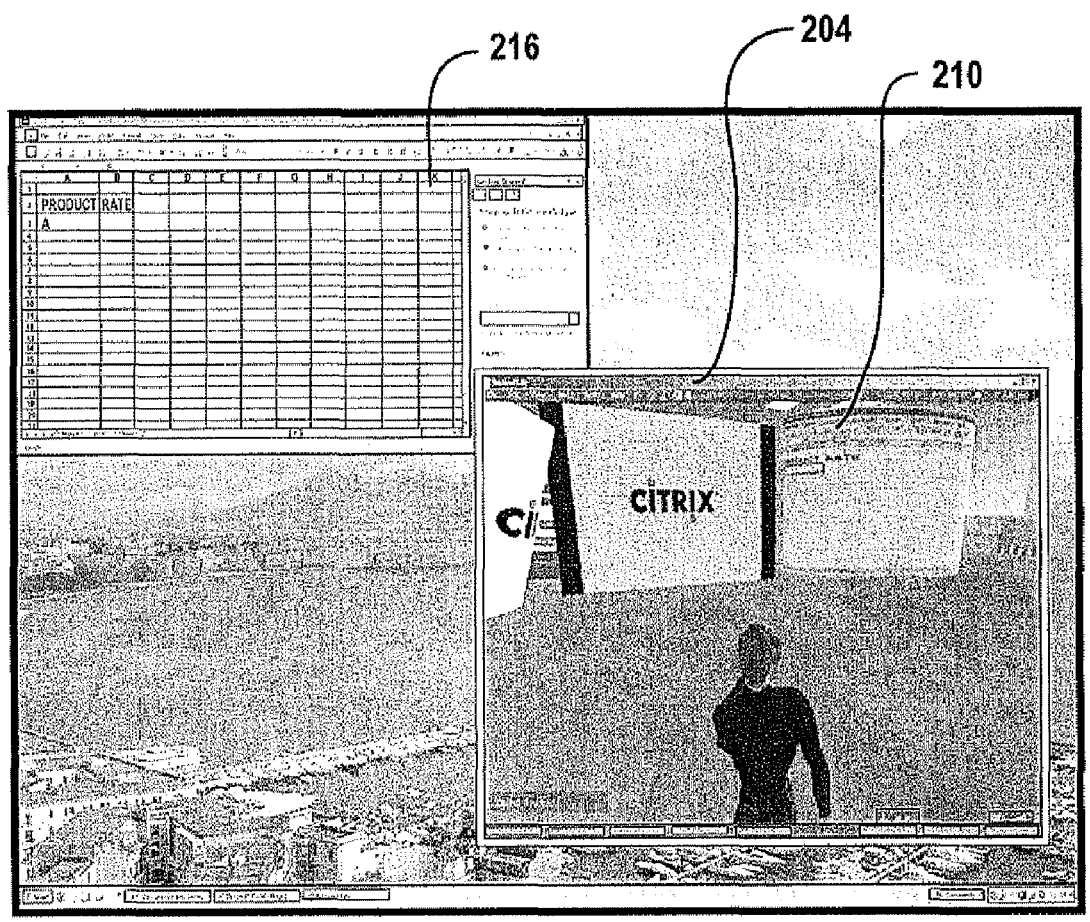
FIG. 2C is a screen shot depicting one embodiment of output data generated by a resource and a virtual world environment displaying the generated output data.

Referring now to FIG. 2C, a screen shot depicts output data generated by a resource 208 and a virtual world environment displaying the generated output data. As shown in FIG. 2C, a user has placed a window displaying output data 216 generated by an execution of the resource 208 into a portion of the desktop reserved for identified resources. The virtual world client 204 renders a virtual world object 210 having a texture including the output data 216.

Figure 2D:
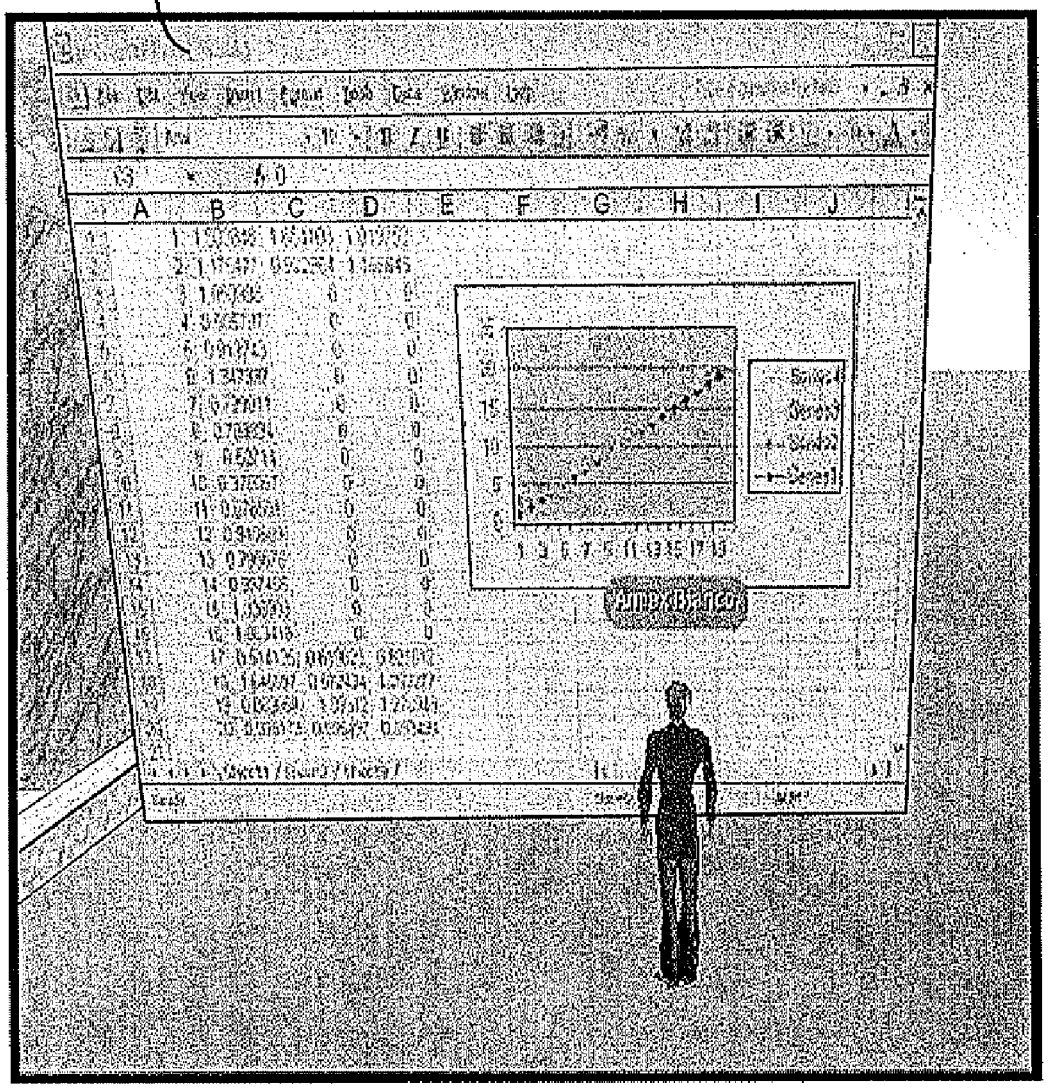
FIG. 2D is a screen shot depicting one embodiment of a virtual world object having a texture incorporating output data generated by an externally-executing resource.

Referring now to FIG. 2D, a screen shot depicts one embodiment of a virtual world object 210 having a texture incorporating output data generated by an externally-executing resource. As depicted in FIG. 2D, the virtual world object 210 is the wall in front of which the avatar for a user is depicted. The output data is the spreadsheet displayed as a texture on the wall. In some embodiments, the output data is generated by a resource, such as a spreadsheet application, executing on a first machine. In other embodiments, described in greater detail below, in connection with FIGS. 4 and 5, the output data is generated by a resource, such as a spreadsheet application, executing on a second machine.

Figure 3:
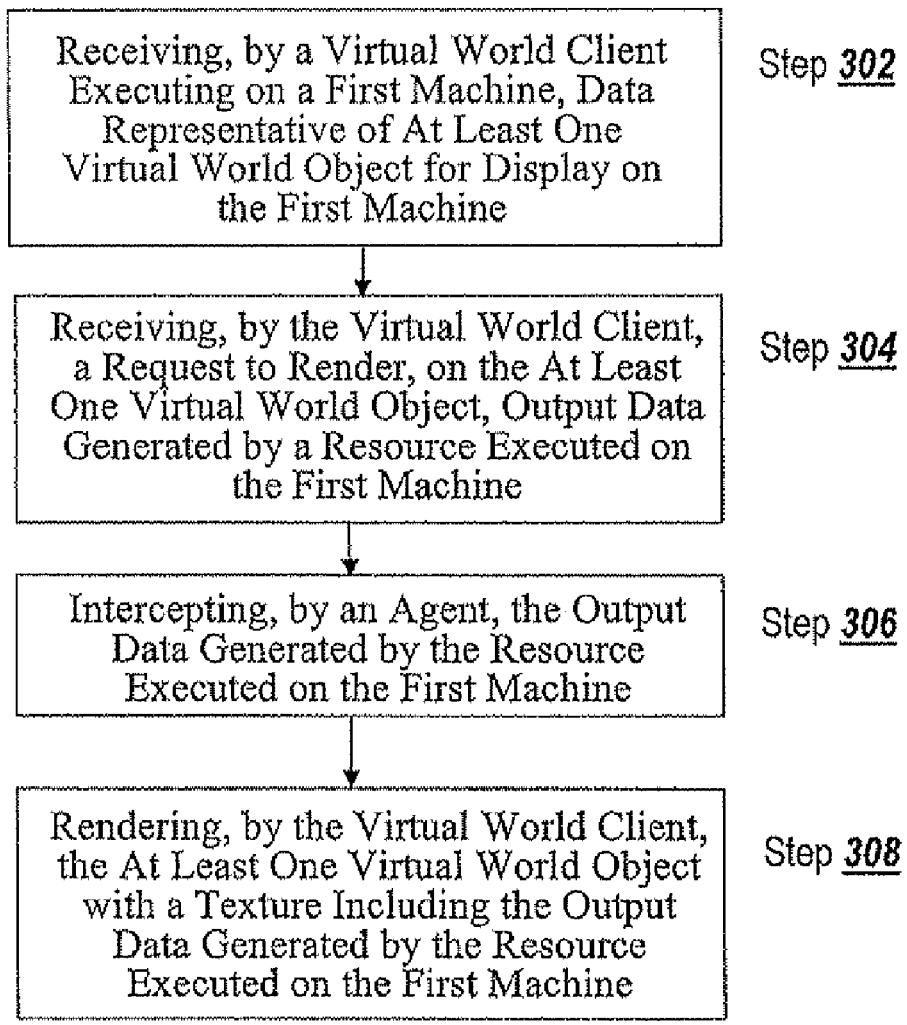
FIG. 3 is a flow diagram depicting one embodiment of the steps taken in a method for providing access, via a command executed in a virtual world application executing on a server, to an application executing on the client device.

Referring now to FIG. 3, a method 300 for displaying, in a virtual world environment, output data generated by a resource executing on a first machine, the virtual world environment generated by a second machine, includes the step of receiving, by a virtual world client executing on a first machine, data representative of at least one virtual world object for display on the first machine (step 302). The method includes the step of receiving, by the virtual world client a request to render, on the at least one virtual world object, output data generated by a resource executed on the first machine (step 304). The method includes the step of intercepting, by an agent in communication with the virtual world client, the output data generated by the resource executed on the first machine (step 306). The method includes the step of rendering, by the virtual world client the at least one virtual world object data with a texture including the output data generated by the resource executed on the first machine (step 308).

With continued reference to FIG. 3, and in greater detail, a virtual world client executing on a first machine receives, from a second machine, data representative of at least one virtual world object for display on the first machine (step 302). In one embodiment, a user of the first machine 102 initiates execution of the virtual world client 204. In another embodiment, the virtual world application 202 transmits, to the virtual world client 204, data representative of a plurality of virtual world objects, which, combined, form a virtual world environment displayed to a user of the first machine 102. In still another embodiment, the virtual world application 202 transmits modeling information to a virtual world client 204 for use in rendering at least one virtual world object. In yet another embodiment, the virtual world application 202 transmits the data to the first machine 102 according to a client-server messaging protocol.

In one embodiment, the virtual world application 202 transmits, to the first machine 102, data including an instruction to render a second virtual world object with a texture including the output data generated by the execution of the resource on the first machine 102. In another embodiment, the virtual world application 202 transmits, to the client device 102, data representative of a modified version of the at least one virtual world object.

In some embodiments, the virtual world application 202 receives, from a second server 106b, output data generated by a second resource 208' executing on the second server 106b. In one of these embodiments, the virtual world application 202 transmits, to the first machine 102, the output data generated by the execution of the second resource 208', data representative of a third virtual world object, and data including instructions for rendering the third virtual world object with a texture including the intercepted output data generated by the resource 208'. In other embodiments, the virtual world application 202 transmits, to the virtual world client 204, data including intercepted output data generated by a resource 208' executed on a second client device 102b. In one of these embodiments, the virtual world application 202 transmits, to the virtual world client 204, data including instructions for rendering a third virtual world object, applying a texture including the intercepted output data generated by the resource 208' to the third virtual world object, and displaying the third virtual world object to a user of the client device 102. In still other embodiments, a second virtual world client 204' executing on a third machine 102b transmits, to the virtual world client 204 intercepted output data generated by a second resource 208'. In one of these embodiments, the virtual world application 202 transmits, to the virtual world client 204, data including instructions for rendering a third virtual world client 204 with a texture including the intercepted output data received from the second virtual world client 204'.

The virtual world client receives a request to render, on the at least one virtual world object, output data generated by an execution of a resource executed on the first machine (step 304). In one embodiment, the virtual world client 204 receives, from an agent 206, an identification of the resource 208 generating the output data. In another embodiment, the virtual world client 204 receives, from a virtual world application 202, an identification of the resource 208 generating the output data. In still another embodiment, the virtual world application 202 receives, from a user of the first machine 102, an identification of a virtual world object associated with the identified resource 208. In still even another embodiment, a user of the first machine 102 initiates execution of the resource 208 on the first machine 102. In yet another embodiment, upon receiving a request to render the output data to the virtual world object, the virtual world client 204 initiates execution of an agent 206.

In some embodiments, the user interacts with a virtual world object to identify, to the virtual world client 204, a resource 208 executed on the first machine 102. In one of these embodiments, the user accesses a menu associated with the virtual world object to select an identification of the resource 208. In another of these embodiments, the user provides an identification of the resource 208 to the virtual world client for association with a virtual world object; for example, the user may transmit an identification of a virtual world object and a process identification number associated with an executing resource to the virtual world client 204 via a command line interface. In still another of these embodiments, the user interacts with the virtual world object, for example, by clicking on the object or by selecting a menu option in a menu associated with the virtual world object or by entering a command associated with the virtual world object into a command line interface.

In other embodiments, the user controls a first virtual world object, such as an avatar, which interacts with a second virtual world object to request the rendering of output data generated by a resource 208 executing on the first machine 102, into the virtual world environment. In one of these embodiments, the avatar represents the user in the virtual world environment. In another of these embodiments, the second virtual world object includes an interface allowing the mapping of actions in the virtual world into input events at the application. For example, the second virtual world object may include a graphical representation of a keyboard or windowing widget (sliders, menus, etc.) with which the first virtual world object, the avatar, may interact. In these embodiments, avatar gestures, movements, relative positions, absolute positions in space, and general interactions with virtual world objects, are translated into events that are understandable to resources executing outside the virtual world environment, such as a word processing application executing on the first machine. The avatar interactions with the second virtual world object may be translated and transmitted to the resource on the client device as keyboard input, mouse input or other input from other input/output modalities.

In some embodiments, the virtual world client 204 receives information associated with a virtual world object. In one of these embodiments, the virtual world client 204 receives modeling information for rendering the virtual world object. In another of these embodiments, the virtual world client 204 receives an identification of a resource generating output to be rendered on the virtual world object. In still another of these embodiments, the virtual world client 204 maintains an association between at least one virtual world object and a resource 208 generating output to be rendered on the virtual world object. In other embodiments, the agent 206 maintains the association between at least one virtual world object and a resource 208 generating output to be rendered on the virtual world object.

In yet other embodiments, a request to render the output data does not specify a particular virtual world object. In one of these embodiments, a user of the client device 102 requests that the output data generated by the execution of the resource 208 on the client device 102 render in a virtual world environment displayed to the first machine 102, which includes a plurality of virtual world objects. In another of these embodiments, the user of the client device 102 does not specify a particular virtual world object onto which to render the output data. In still another of these embodiments, the agent 206 identifies a virtual world object onto which to render the output data. In still even another of these embodiments, the virtual world client 204 identifies a virtual world object onto which to render the output data. In yet another of these embodiments, the virtual world application 202 identifies a virtual world object onto which to render the output data.

An agent intercepts the output data generated by the resource executed on the first machine (step 306). In one embodiment, the agent 206 executes on the first machine 102. In another embodiment, the user initiates execution of the agent 206. In still another embodiment, a virtual world client 204 initiates execution of the agent 206. In yet another embodiment, the virtual world application 202, executing on the second machine 106, initiates execution of the agent 206. In some embodiments, the virtual world client 204 performs the functionality of the agent 206. In one of these embodiments, the virtual world client 204 is a modified version of a virtual world client 204 and the agent 206 is a component of the modified virtual world client 204. In other embodiments, the agent 206 intercepts the output data generated by a resource 208 directing the display of output data to a reserved portion of a display area displayed to a user of the first machine 102.

In some embodiments, the agent 206 intercepts communications between a resource 208 and a window management component executing on the first machine 102. In one of these embodiments, the resource 208 instructs a window management component executing on the first machine 102 to display output data to a particular on a display. For example, the resource may instruct the window management component to display output data to a window in a desktop, the window associated with the resource 208. In another of these embodiments, the agent 206 intercepts an instruction including output data generated by the resource 208. In still another of these embodiments, the agent 206 intercepts the instruction prior to the rendering of the output data on the first machine 102; for example, by capturing the data at a graphics device interface or at a DIRECTX interface.

In one embodiment, the agent 206 generates a bitmap representative of the output data. In another embodiment, the agent 206 generates graphical data representative of the output data in any format capable of translation into a rendering of the output data, including two-dimensional and three-dimensional renderings.

In some embodiments, the agent 206 stores the intercepted output data. In other embodiments, the agent 206 transmits the intercepted output data to the virtual world client 204. In one of these embodiments, the agent 206 transmits the intercepted output data with an identification of a virtual world object onto which to render the intercepted output data as a texture. In another of these embodiments, the agent 206 transmits the intercepted output data upon receiving a request from the virtual world client 204 for the intercepted output data, the request including an identification of a resource 208 generating the output data.

The virtual world client 204 renders the at least one virtual world object with a texture including the output data generated by the execution of the resource on the first machine (step 308). In one embodiment, the virtual world application 202 transmits, to the first machine 102, data including an instruction to render the virtual world object with the texture including the output data generated by the execution of the resource 208 on the first machine 102. In another embodiment, the virtual world client 204 receives data including an instruction regarding the application of a texture to a rendered virtual world object. For example, the virtual world application 202 may transmit, to the virtual world client 204, data including an instruction regarding how to center, stretch, tile, or otherwise apply the texture to the rendered virtual world object. In another embodiment, the virtual world client 204 receives, from the agent 206, a bitmap representing intercepted output data. In still another embodiment, the virtual world client 204 applies the bitmap as a texture to a virtual world object rendered according to data received from the virtual world application 202.

In one embodiment, the virtual world client 204 renders a virtual world object for display to a user of the client device 102, responsive to the data representative of the virtual world object having a texture including the output data generated by the execution of the resource on the client device. In another embodiment, applying a texture including an intercepted bitmap enables the virtual world client 204 to display, to a user of the client device 102, the output of a resource executed on the client device 102 within the virtual world environment generated by the virtual world application executing on the server 106.

In some embodiments, the virtual world application 202 receives output data generated by a second resource executed on a second server. In one of these embodiments, the virtual world application 202 transmits, to the first machine 102, the output data generated by the execution of the second resource 208' and data representative of a third virtual world object. In still another of these embodiments, the virtual world application 202 transmits, to the first machine 102, data representative of the output data—such as a bitmap—for application to the third virtual world object. In yet another of these embodiments, the virtual world client 204 receives data representative of a virtual world object from the virtual world application 202 and receives output data for application to the virtual world object from a third machine 102' or 106'.

In other embodiments, the virtual world client 204 forwards intercepted output data received from the agent 206. In one of these embodiments, the virtual world client 204 transmits the intercepted output data to the virtual world application 202. In another of these embodiments, the virtual world client 204 transmits the intercepted output data to a third machine 102'. In still another of these embodiments, a third machine 102' receives a reference (e.g., a URL, URI, a file system reference, or an IP address/port number) to a location where the virtual world client 204 has stored the intercepted output data. In yet another of these embodiments, the virtual world client 204 transmits, to a second virtual world client 204' on a first machine 102', a bitmap representing intercepted output data for application as a texture to a virtual world object rendered by the second virtual world client 204'.

In some embodiments, the virtual world application 202 transmits, to each of a plurality of virtual world clients 204 executing on a plurality of first machines 102, data representative of at least one virtual world object and an instruction to render the at least one virtual world object with a texture including intercepted output data generated by a resource 208 executing on one of the plurality of first machines 102. In one of these embodiments, the one of the plurality of first machines transmits, to each of the plurality of virtual world clients 204, the intercepted output data.

In other embodiments, the virtual world application 202 transmits, to a subset of a plurality of virtual world clients 204 executing on a plurality of first machines 102, data representative of at least one virtual world object and an instruction to render the at least one virtual world object with a texture including intercepted output data generated by a resource 208 executing on one of the plurality of first machines 102. In one of these embodiments, the one of the plurality of first machines transmits, to the subset of the plurality of virtual world clients 204, the intercepted output data.

In still other embodiments, the virtual world application 202 transmits, to a second virtual world application 202', data representative of at least one virtual world object and an instruction to render the at least one virtual world object with a texture including intercepted output data generated by a resource 208 executing on a first machine 102. In one of these embodiments, the virtual world application 202 executes a different virtual world process than the second virtual world application 202'. For example, the virtual world application 202 may provide users with access to a virtual world environment provided by SECOND LIFE and the second virtual world application 202 may provide users with access to a virtual world environment provided by ALICE STREET CONFERENCE CENTER.

Figure 4:
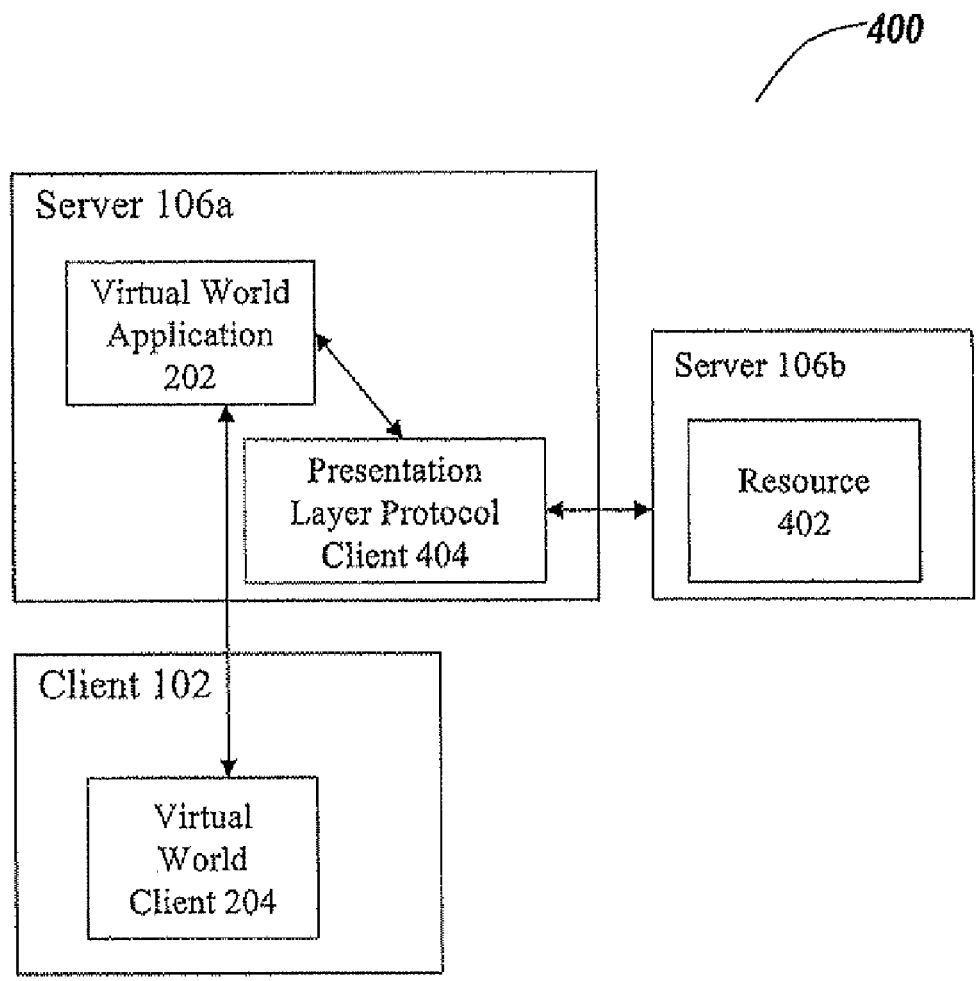
FIG. 4 is a block diagram depicting one embodiment of a system for providing access, via a command executed in a virtual world application executing on a first server, to a resource executing on a second server.

Referring now to FIG. 4, a block diagram depicts one embodiment of a system for providing access, via a command executed in a virtual world application executing on a first server, to a resource executing on a second server. In brief overview, the system includes a virtual world application 202 executing on a server 106a, a resource 402 executing on a server 106b, and a virtual world client 204 executing on a client device 102. The client device 102 displays output data generated by a virtual world application 202. The server 106a, which executes the virtual world application 202, receives, from the server 106b, output data generated by the execution of the requested resource 402, and transmits, to the client device 102, the received output data and data representative of at least one virtual world object.

Referring now to FIG. 4, and in greater detail, the client device 102 displays data generated by a virtual world application 202. In one embodiment, the virtual world application 202 transmits data representative of a plurality of virtual world objects which combined form a virtual world environment displayed to a user of the client device 102. In another embodiment, the virtual world application 202 transmits modeling information to a virtual world client 204 for use in rendering at least one virtual world object. In still another embodiment, the virtual world application 202 transmits the data to the client device 102 according to a virtual world client-server messaging protocol. In yet another embodiment, the virtual world application 202 transmits the data to the client device 102 according to a network protocol.

In one embodiment, the virtual world object is a graphical representation of a resource, such as an icon representing a computing environment, application, or other resource. In another embodiment, the virtual world object is a graphical representation of a resource provider; for example, an icon associated with a provider of an application, computing environment, or other resource. In still another embodiment, the virtual world application 202 transmits, to the virtual world client 204, a texture to apply to the virtual world object, the texture depicting the resource or resource provider.

The server 106a, which executes the virtual world application 202, receives, from the server 106b, output data generated by the execution of the requested resource 402. In one embodiment, the server 106a receives a request from the client device 102 for access to the requested resource 402. In another embodiment, the server 106a receives a request from the client device 102 for an enumeration of resources available to a user of the client device 102.

In some embodiments, the virtual world application 202 executing on the server 106a receives a request for access to a resource or for an enumeration of resources available to a user of the client device 102. In one of these embodiments, a user viewing a display, on a client device 102, of a virtual world object interacts with the virtual world object to request access to a resource or to request an enumeration of resources available to the user. For example, and in another of these embodiments, a user may request access to a resource by clicking on a virtual world object, selecting a menu option in a menu associated with the virtual world object, or entering a command associated with the virtual world object into a command line interface displayed by the client device 102. Additionally, and as described above in connection with FIG. 3, in still another of these embodiments, avatar gestures, movements, relative positions, absolute positions in space, and general interactions with virtual world objects, are translated into events that are understandable to resources executing outside the virtual world environment, such as a word processing application executing on a client device. In still another embodiment, a user interaction with one virtual world object initiates a request for execution of multiple resources, which may execute on one or more servers 106b.

In other embodiments, the virtual world application 202 receives a notification of a selection, by a user, of a graphical representation of a resource displayed in a plurality of graphical representation of resources. In one of these embodiments, the virtual world application 202 may receive a request for an enumeration of a plurality of resources available to the user. For example, the user may click on a virtual world object, select a menu option, or enter a command to a command line interface in order to transmit the request for the enumeration of the plurality of available resources to the virtual world application 202, via the virtual world client 204. In another of these embodiments, the virtual world application 202 identifies a server 106b providing access to the enumeration of the plurality of available resources. In still another of these embodiments, the virtual world application 202 requests the enumeration of the plurality of available resources from the server 106b. In still even another of these embodiments, the virtual world application 202 transmits, to the virtual world client 204, for display to the user, the received enumeration of the plurality of available resources. In still another of these embodiments, the virtual world client 204 applies a texture to a virtual world object displayed to the user, the texture depicting the received enumeration of the plurality of available resources. In yet another of these embodiments, the virtual world application 202 receives, from the virtual world client 204, an identification of an available resource in the plurality of available resources, the available resource selected by the user of the client device 102.

In some embodiments, a user may view a display of a virtual world object, such as a wall, having a texture that depicts at least one icon representing an available resource in the enumeration of available resources In one of these embodiments, the user may interact with the virtual world object that displays an icon representing an available resource the client wishes to access; for example, the user may click on a portion of the wall including an icon representing an application the user wishes to access. In another of these embodiments, the virtual world client 204 detects the user interaction with the virtual world object (in this embodiment, the click) and identifies the user interaction as a request for access to the represented available resource. In still another of these embodiments, the virtual world client 204 accesses a mapping to identify a resource associated with a texture or portion of a texture. In still even another of these embodiments, the virtual world client 204 transmits the identification of the selected resource to the virtual world application 202. In still another of these embodiments, the virtual world client 204 transmits, to the virtual world application 202, an identification of the texture or portion of the texture with which the user interacted and the virtual world application 202 identifies an available resource associated with the texture or portion of the texture.

In one embodiment, the virtual world application 202 includes an agent providing functionality for communicating with the server 106b. In another embodiment, the virtual world application 202 includes a presentation layer protocol client 404, such as an ICA client, an RDP client, or an X11 client. In some embodiments, the agent communicates with the server 106b using a presentation layer protocol, such as the Independent Computing Architecture (ICA) protocol, manufactured by Citrix Systems, Inc. of Fort Lauderdale, Fla., the RDP protocol, manufactured by Microsoft Corp. of Redmond, Wash.; the X11 protocol; or the Virtual Network Computing (VNC) protocol, manufactured by AT&T Laboratories Cambridge. In still another embodiment, the virtual world application 202 is in communication with the presentation layer protocol client 404. In still even another embodiment, the presentation layer protocol client 404 executes on the server 106a. In yet another embodiment, not shown in FIG. 4, the presentation layer protocol client 404 executes on an intermediate server 106c. In some embodiments, the presentation layer protocol client 404 communicates with the server 106b on behalf of the virtual world application 202.

In some embodiments, the virtual world application 202 includes a second agent. In one of these embodiments, the second agent receives the output data from the first agent 404. In another of these embodiments, the second agent receives the output data from the second server. In still another of these embodiments, the second agent transmits the output data to the virtual world client 204. In still even another of these embodiments, the virtual world application 202 is modified to include a second agent. In yet another of these embodiments, the virtual world application 202 is modified to provide the functionality of a second agent.

In one embodiment, the server 106b receives the request for access to the identified resource 402 from the server 106a. In another embodiment, the server 106b executes the resource 402. In still another embodiment, the server 106b transmits, to the server 106a, output data generated by the resource 402. In still even another embodiment, the server 106b transmits, to the server 106a, via a presentation layer protocol, the output data generated by the resource 402 executing on the server 106b. In yet another embodiment, the server 106b identifies a server 106c to execute the resource 402 and transmit the output data generated by the resource executed on the server 106c to the server 106a.

The server 106a transmits, to the client device 102, the received output data and data representative of at least one virtual world object. In one embodiment, the server 106a transmits, to the client device 102 a file, such as a bitmap file, representing the received output data. In another embodiment, the server 106a transmits, to the client device 102, data including an instruction for applying the file representing the received output data to the at least one virtual world object. In still another embodiment, the server 106a transmits, to a plurality of client devices 102, data representing the received output data and the data representative of the at least one virtual world object. In yet another embodiment, the server 106a transmits to a plurality of client devices, via a plurality of virtual world protocols, the received output data and data representative of at least one virtual world object.

Figure 5:
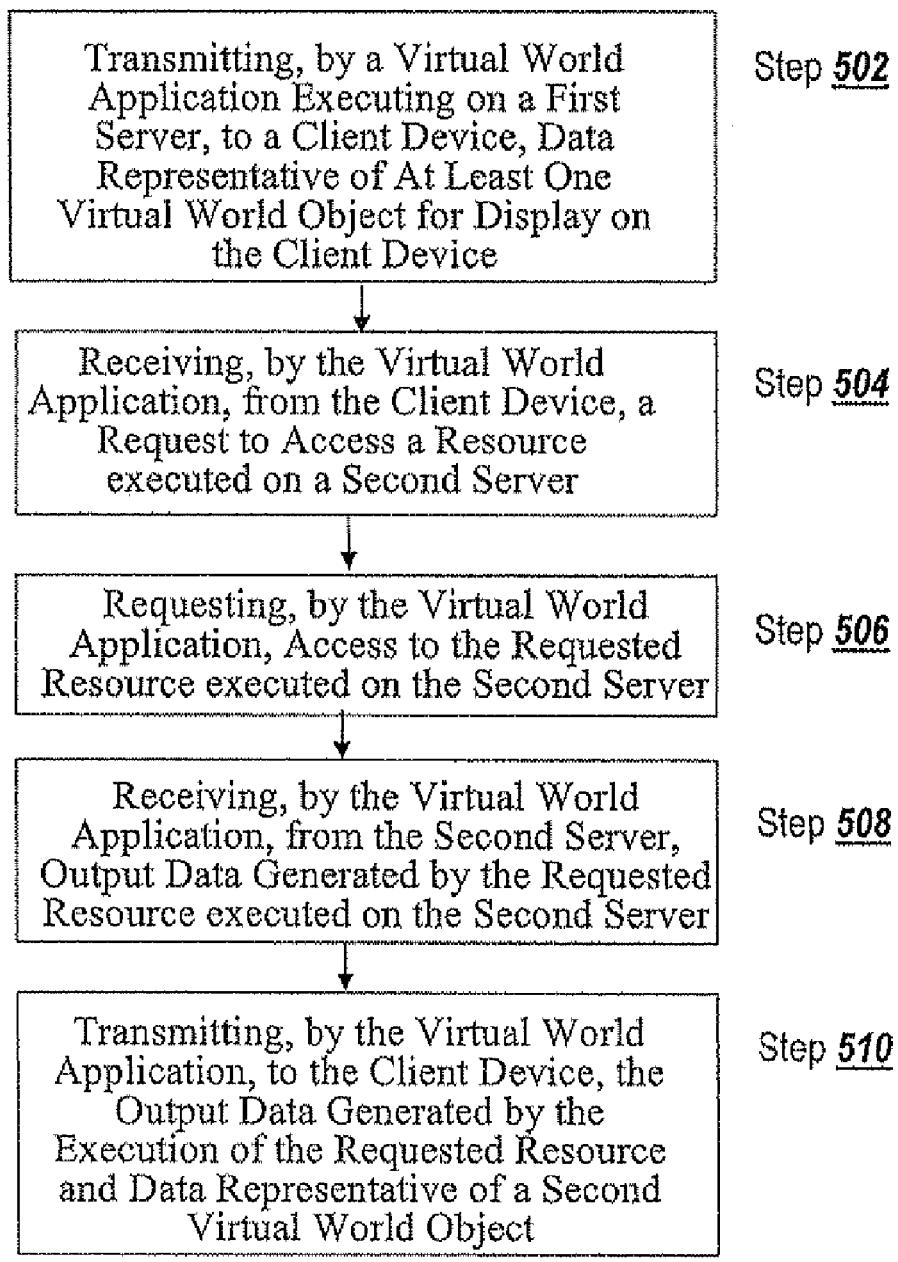
FIG. 5 is a flow diagram depicting one embodiment of the steps taken in a method for providing access, via a command executed in a virtual world application executing on a first server, to a resource executing on a second server.

Referring now to FIG. 5, a flow diagram depicts one embodiment of the steps taken in a method 500 for providing access, via a command executed in a virtual world application executing on a first server, to a resource executing on a second server. In brief overview, a virtual world application executing on a first server transmits, to a client device, data representative of at least one virtual world object for display on the client device (step 502). The virtual world application receives, from the client device, a request to access a resource provided by a second server (step 504). The virtual world application requests access to the requested resource provided by the second server (step 506). The second server transmits, to the virtual world application, output data generated by an execution of the requested resource on the second server (step 508). The virtual world application transmits, to the client device, the output data generated by the execution of the requested resource and data representative of a second virtual world object (step 510).

Referring now to FIG. 5, and in greater detail, a virtual world application executing on a first server transmits, to a client device, data representative of at least one virtual world object for display on the client device (step 502). In one embodiment, the virtual world application 202 transmits data representative of a plurality of virtual world objects which combined form a virtual world environment displayed to a user of the client device 102. In another embodiment, the virtual world application 202 transmits modeling information to a virtual world client 204 for use in rendering at least one virtual world object. In still another embodiment, the virtual world application 202 transmits the data to the client device 102 according to a virtual world client-server messaging protocol. In yet another embodiment, the virtual world application 202 transmits the data to the client device 102 according to a network protocol.

The virtual world application receives, from the client device, a request to access a resource provided by a second server (step 504). In one embodiment, the virtual world application 202 receives, from the virtual world client 204, a request for access to the requested resource 402. In another embodiment, the virtual world application 202 receives, from the virtual world client 204, a request for an enumeration of resources available to a user of the client device 102. In some embodiments, the virtual world application 202 receives the request as described above in connection with FIG. 4.

The virtual world application requests access to the requested resource provided by the second server (step 506). In one embodiment, the virtual world application 202 provides, to the presentation layer protocol client 404, a request for an enumeration of resources available to a user. In another embodiment, the presentation layer protocol client 404 transmits, to the server 106b, the request for the enumeration of resources available to the user. In still another embodiment, the virtual world application 202 provides, to a presentation layer protocol client 404, an identification of a requested resource 402. In yet another embodiment the presentation layer protocol client 404 transmits, to the server 106, via a presentation layer protocol, a request for access to a resource. In some embodiments, the presentation layer protocol client 404 communicates with an agent executing on the server 106b.

In one embodiment, the virtual world application 202 transmits a request to the server 106b for access to the identified resource. In another embodiment, the virtual world application 202 transmits, to the server 106b, user credentials to authenticate the user to the server 106b. In still another embodiment, the presentation layer protocol client 404, in communication with the virtual world application 202, transmits, to the server 106b, the request for access to the identified resource and any applicable user credentials.

The second server transmits, to the virtual world application, output data generated by an execution of the requested resource on the second server (step 508). In one embodiment, the server 106b transmits, to the server 106a, via a presentation layer protocol, the output data generated by the resource 402 executing on the server 106b. In another embodiment, the server 106b identifies a server 106c to execute the resource 402 and transmit the output data generated by the resource 402 executed on the server 106c to the server 106a.

The virtual world application transmits, to the client device, the output data generated by the execution of the requested resource and data representative of a second virtual world object (step 510). In one embodiment, the server 106a transmits, to the client device 102 a file, such as a bitmap file, representing the received output data. In another embodiment, the server 106a transmits, to the client device 102, data including an instruction for applying the file representing the received output data to the at least one virtual world object. In still another embodiment, the server 106a transmits, to the client device 102, human-perceptible data generated by the resource executing on the second server. For example, in addition to visual output data, the server 106 may transmit audio output data, such as audio feeds from conferencing software.

In one embodiment, the server 106a transmits, to a plurality of client devices 102, data representing the received output data and the data representative of the at least one virtual world object, for display of the output data to a plurality of users. In another embodiment, the server 106a transmits to a plurality of client devices, via a plurality of virtual world protocols, the received output data and data representative of at least one virtual world object.

In some embodiments, the server 106a allows the sharing of content between users. In one of these embodiments, the server 106a transmits the output data generated by a first user to a plurality of users. In another of these embodiments, a second user in the plurality of users views the output data generated on the client device 102 of the first user. In still another of these embodiments, the plurality of users share control of the output data; for example, by allowing one or more of the users to interact with the virtual world object displaying the output data.

In some embodiments, the virtual world application 202 executing on a first server 106a transmits, to each of a plurality of virtual world clients 204 executing on a plurality of client devices 102, data representative of at least one virtual world object and an instruction to render the at least one virtual world object with a texture including output data generated by a resource 208 executing on a second server 106b. In one of these embodiments, the virtual world application 202 transmits, to each of the plurality of virtual world clients 204, the output data. In another of these embodiments, the virtual world application 202 transmits, to the second server 106b, an instruction to transmit the output data to each of the plurality of virtual world clients 204. In still another of these embodiments, the second server 106b, in communication with a presentation layer protocol agent executing on each of the plurality of client devices 102, establishes a session with each of the plurality of client devices 102 within which the second server 106b transmits generated output data.

In some embodiments, the virtual world application 202 executing on a first server 106a transmits, to a subset of a plurality of virtual world clients 204 executing on a plurality of client devices 102, data representative of at least one virtual world object and an instruction to render the at least one virtual world object with a texture including output data generated by a resource 208 executing on a second server 106b. For example, the virtual world application 202 may transmit the data to members of a group instead of to all users, or the virtual world application 202 may transmit the data to users with certain authorization privileges. In one of these embodiments, the virtual world application 202 transmits, to the subset of the plurality of virtual world clients 204, the output data. In another of these embodiments, the virtual world application 202 transmits, to the second server 106b, an instruction to transmit the output data to the subset of the plurality of virtual world clients 204. In still another of these embodiments, the second server 106b, in communication with a presentation layer protocol agent executing on the subset of the plurality of client devices 102, establishes a session with the subset of the plurality of client devices 102 within which the second server 106b transmits generated output data.

In some embodiments, users in a virtual world environment may interact with users outside the virtual world environment. In one of these embodiments, a first user that is not a user of a virtual world environment may be execute a resource on a client device 102 and transmit the output data to the virtual world environment used by a second user with which the first user wishes to interact. For example, the first user may execute a video conference application and have the output data sent to users in the virtual world environment. Because the video conference application can be accessed both in the real world and in the virtual world environment, a meeting can be held between avatars in the virtual world and 'real users' in the real world.

In other embodiments, users in different virtual worlds may interact with each other. In one of these embodiments, a user of a first virtual world environment provided by a first server may request access to a resource provided by a second server. In another of these embodiments, a user of a second virtual world environment provided by a third server may request access to the same resource provided by the second server. In still another of these embodiments, the second server may transmit output data generated by the resource to the first server providing the first virtual world environment and also transmit the output data to the third server providing the second virtual world environment.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for providing access, via a virtual world, to an externally executing resource, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for providing for a virtual world provided by a first server access to a resource residing on a second server unaffiliated with the virtual world, the method comprising:
    (a) providing, by a virtual world client executing on a client device, a virtual world using data received from a virtual world application executing on a first server, the data comprising at least one virtual world object;

(b) receiving, by the virtual world application, from the virtual world client, a request to access a resource residing on a second server unaffiliated with the virtual world;

(c) connecting, by the virtual world application, to the requested resource residing on the second server using a presentation layer protocol data stream;

(d) generating, by the virtual world application, output data using the requested resource residing on the second server over the presentation layer protocol data stream;

(e) transmitting, by the virtual world application, to the virtual world client using the presentation layer protocol data stream, the output data generated using the requested resource and data representative of a modified version of the at least one virtual world object; and (f) displaying, by the virtual world client, the output data generated using the requested resource and the at least one virtual world object provided by the virtual world application in the virtual world provided by the virtual world client.

2. The method of claim 1, wherein step (e) further comprises transmitting, by the virtual world application, to the virtual world client, data representative of a second virtual world object having a texture including the generated output data.

3. The method of claim 2, wherein step (e) further comprises transmitting, by the virtual world application, to the virtual world client, data including an instruction to render the second virtual world object with the texture including the generated output data.

4. The method of claim 1, further comprising receiving, by an agent on the first server, output data generated using the requested resource provided by the second server.

5. The method of claim 1, further comprising receiving, by an agent on the first server, output data generated using a second resource provided by a third server.

6. The method of claim 1, further comprising displaying, by the virtual world client executing on the client device, data representative of a second virtual world object having a texture including the output data generated using the requested resource.

7. A system for providing for a virtual world provided by a first server access to a resource residing on a second server unaffiliated with the virtual world, the system comprising:

a virtual world client executing on a client device provides a virtual world using data received from a virtual world application executing on a first server, the data comprising at least one virtual world object; and displays the data received from virtual world application in the virtual world provided by the virtual world client;

the virtual world application executing on the first server receives from the virtual world client a request to access a resource residing on a second server unaffiliated with the virtual world;

connects to the requested resource residing on the second server using a presentation layer protocol data stream;

generates output data using the requested resource residing on the second server over the presentation layer protocol data stream; and transmits to the virtual world client using the presentation protocol data stream the output data generated using the requested resource and data representative of a modified version of the at least one virtual world object; and the second server where the requested resource resides.

8. The system of claim 7, wherein the virtual world application further comprises an agent receiving, from the first server, output data generated using the requested resource, and transmitting, to the virtual world client, data representative of at least one virtual world object and the received output data.

9. The system of claim 7, wherein the virtual world application further comprises an agent transmitting to the virtual world client data representative of a second virtual world object having a texture including the output data generated using the requested resource.

10. The system of claim 7, wherein the virtual world application further comprises an agent transmitting, to the virtual world client, data including an instruction to render the second virtual world object with the texture including the output data generated using the requested resource.

11. The system of claim 7, wherein the virtual world application further comprises an agent receiving output data generated using a second resource provided by a third server.

12. The system of claim 7, further comprising the virtual world client executing on the client device and displaying data representative of at least one virtual world object having a texture including the output data generated using the requested resource.

* * * * *